United States Patent
Wang et al.

(10) Patent No.: US 8,759,422 B2
(45) Date of Patent: Jun. 24, 2014

(54) B-STAGEABLE AND SKIP-CURABLE WAFER BACK SIDE COATING ADHESIVES

(71) Applicant: Henkel Corporation, Rocky Hill, CT (US)

(72) Inventors: Eric C. Wang, Irvine, CA (US); Kevin Harris Becker, Cerritos, CA (US); Qizhuo Zhuo, Irvine, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/799,363

(22) Filed: Mar. 13, 2013

(65) Prior Publication Data

US 2013/0197130 A1    Aug. 1, 2013

Related U.S. Application Data

(63) Continuation of application No. PCT/US2011/033756, filed on Apr. 25, 2011.

(60) Provisional application No. 61/471,899, filed on Apr. 5, 2011, provisional application No. 61/472,399, filed on Apr. 6, 2011.

(51) Int. Cl.
| | | |
|---|---|---|
| *C09J 163/00* | (2006.01) | |
| *C09J 163/02* | (2006.01) | |
| *C09J 163/04* | (2006.01) | |
| *C08L 63/00* | (2006.01) | |
| *C08L 63/02* | (2006.01) | |
| *C08L 63/04* | (2006.01) | |
| *C08G 59/20* | (2006.01) | |
| *C08G 59/22* | (2006.01) | |
| *C08G 59/32* | (2006.01) | |
| *B32B 27/18* | (2006.01) | |
| *B32B 27/38* | (2006.01) | |

(52) U.S. Cl.
USPC ........... 523/427; 156/330; 523/445; 523/457; 523/466; 523/468; 525/524; 525/525; 525/526; 525/529; 525/530; 525/533

(58) Field of Classification Search
USPC ......... 523/400, 427, 433, 434, 435, 436, 437, 523/438, 445, 457, 458, 466, 468; 525/523, 525/524, 525, 526, 529, 530, 533; 156/330
See application file for complete search history.

(56) References Cited

U.S. PATENT DOCUMENTS

| | | | |
|---|---|---|---|
| 5,945,203 A * | 8/1999 | Soane | 428/209 |
| 7,176,044 B2 | 2/2007 | Forray et al. | |
| 7,851,254 B2 | 12/2010 | Forray et al. | |
| 2004/0058181 A1 | 3/2004 | Garnault et al. | |
| 2008/0051524 A1 | 2/2008 | Ji et al. | |
| 2009/0088527 A1* | 4/2009 | Seo et al. | 525/187 |
| 2010/0130655 A1 | 5/2010 | Agarwal et al. | |

* cited by examiner

*Primary Examiner* — Michael J Feely
(74) *Attorney, Agent, or Firm* — Steven C. Bauman

(57) ABSTRACT

An adhesive composition comprising elastomeric polymer, epoxy resin, reactive diluent, and filler, is suitable for use within the electronics industry, and in particular for wafer back side coating adhesives. The elastomeric polymer is a mixture of a vinyl elastomer and an epoxy elastomer; the reactive diluent is a combination of two or more diluents, one of which must have carbon to carbon unsaturation, providing cross-linking within the composition after cure; and the filler is a non-conductive filler.

10 Claims, No Drawings

B-STAGEABLE AND SKIP-CURABLE WAFER BACK SIDE COATING ADHESIVES

BACKGROUND OF THE INVENTION

Adhesives are used frequently in the fabrication of electronic devices, for example, to attach individual semiconductor dies to substrates. In one method of semiconductor assembly, a semiconductor die is adhered to its substrate with a paste or film adhesive. The assembly is then subjected to heat to cure the adhesive so that it develops sufficient strength to survive subsequent processing steps and to eliminate voids formed by out-gassing during these later fabrication stages. Depending on the adhesive chemistry, this cure schedule can be as long as an hour. The active terminals on the surface of the semiconductor die are then connected to the active terminals on the substrate with metal wires in an automated operation known as wire bonding, which occurs at about 125° to 210° C. After wire bonding, the assembly is encapsulated in a molding compound to protect the active surface of the semiconductor and the wire bonds. This molding operation occurs at about 170° to 180° C. The need for the heat treatment to cure the die attach adhesive before the wire bonding and molding operations reduces manufacturing throughput significantly and is especially inefficient when the fabrication requires multi-die stacking.

The current trend in semiconductor packaging fabrication favors completing as many process steps as possible at the silicon wafer level, before the wafer is diced into individual semiconductor dies. A further trend for stacked die packages is to combine or eliminate as many cure steps as possible. This allows multiple semiconductor dies to be processed at the same time, making the fabrication process more efficient. One step that can occur at the wafer level is the application of the adhesive for attaching the semiconductor dies to substrates. The adhesive is commonly known as a wafer backside coating adhesive and is typically applied by screen or stencil printing, spin-coating, or nozzle spraying. After application, the coating is thermally or photochemically treated to evaporate solvent and/or partially advance the adhesive resin (known as B-staging). This strengthens the adhesive for the further fabrication processes.

Thus, it would be an advantage to provide an adhesive that has sufficient adhesive strength to withstand the subsequent processing steps without needing an extra cure stage after die attach.

SUMMARY OF THE INVENTION

This invention is an adhesive composition that has sufficient mechanical and adhesive strength to withstand manufacturing operations at temperatures between 125° to 210° C. without first being cured. In brief, the cure after the die attach operation is skipped, and the adhesive can perform without out-gassing and creating voids through the wire bonding operation, at temperatures typically 125° to 210° C., and molding operation, at temperatures typically 170° to 180° C.

This skip-cure adhesive composition comprises reactive elastomeric polymer, epoxy resin, reactive diluent, and filler.

The elastomeric polymer is a mixture of a vinyl elastomer (an elastomer having two or more carbon to carbon double bonds) and an epoxy elastomer (an elastomer having two or more epoxy groups), present in an amount within the range of 20% to 40% by weight, and preferably about 30% by weight, of the adhesive composition.

The epoxy resin, which is not an epoxy elastomer, is present in the adhesive composition in the range of 3% to 10% by weight, and preferably about 5% by weight.

The reactive diluent is a combination of two or more diluents, one of which must have carbon to carbon unsaturation to react with the acrylate elastomer, providing cross-linking within the composition after cure. One or both reactive diluents must be able to act as diluent or solvent for the elastomeric polymer, and together they are present in the adhesive composition within the range of 35% to 50% by weight of the composition.

The filler is a non-conductive filler and makes up the remainder of the composition to a total of 100% by weight.

DETAILED DESCRIPTION OF THE INVENTION

The elastomeric polymer is a blend of a vinyl elastomer and an epoxy elastomer, in which the vinyl elastomer and the epoxy elastomer are present in a weight ratio of about 1:3, respectively to each other. The vinyl and epoxy elastomers will have weight average molecular weights (MW) within the range of 3000 to 100,000, and will have glass transition temperatures (Tg) within the range of −65° to 20° C. The elastomeric polymer (mixture of the vinyl and epoxy elastomers) will be present in the adhesive composition within the range of 20% to 40% by weight.

The elastomers can be selected from a range of elastomers, provided they contain vinyl or epoxy functionality. Suitable elastomers are selected from the group consisting of butadiene-acrylonitrile rubbers, butadiene rubbers, nitrile butadiene rubbers, polyurethane elastomers, polyisobutene elastomers, polyisoprene elastomers, polyester amide elastomers, ethylene-vinyl acetate copolymer elastomers, polypropylene elastomers, polyethylene elastomers, siloxane elastomers, and copolymers prepared from two or more of styrene, isoprene, butadiene, ethylene, and propylene. Other suitable elastomers are selected from the group consisting of divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, polyacrylonitriles, ethylene acrylate copolymers, and ethylene acrylate terpolymers. In one embodiment the elastomers are butadiene-acrylonitrile rubbers; the vinyl elastomer is an acrylate terminated butadiene-acrylonitrile rubber; and the epoxy elastomer is an epoxy terminated butadiene-acrylonitrile rubber.

The epoxy resin can be chosen from a wide variety of commercially available resins, and in some embodiments is selected from the group consisting of novolac epoxy resins, bis-phenol epoxy resins, aliphatic epoxy resins, and aromatic epoxy resins. In one embodiment, the epoxy resin has a weight average molecular weight of 3000 or less. The epoxy resin will be present in an amount within the range of 3% to 10% by weight, and preferably about 5% by weight.

One or more reactive diluents will be present in an amount within the range of 35% to 50% by weight of the composition. The reactive diluents will be chosen to dissolve or dilute the elastomers and will contain both carbon-carbon double bonds and either an epoxy or hydroxyl functionality. In one embodiment, the reactive diluents are selected from the group consisting of THF acrylate monomer, 4-hydroxybutyl acrylate glycidylether monomer, glycidyl acrylate, glycidyl methacrylate, 1,4-cyclohexanedimethanol monoacrylate. In practice, any acrylate or methacrylate containing an epoxy or hydroxyl group would be expected to perform satisfactorily. The adhesive composition will be adjusted with the reactive diluents to bring the viscosity of the composition within the range of 1000 to 3000 mPa·s (cps) at room temperature at 5 rpm.

Nonconductive fillers are added to adjust rheology of the uncured adhesive and to fine tune the modulus and coefficient of thermal expansion of the cured adhesive. The filler can be any effective size and shape. Suitable non-conductive fillers are selected from the group consisting of ground quartz, fused silica, amorphous silica, talc, glass beads, graphite, carbon black, alumina, clays, mica, vermiculite, aluminum nitride, and boron nitride. In one embodiment the filler is silica. The filler will be present in the composition in the remaining weight percent to a total of 100% by weight.

In one embodiment, the adhesive composition will further contain a photoinitiator to activate the vinyl functionality and a latent catalyst to activate the epoxy functionality.

Other components, typically used in coating compositions, may be added at the option of the practitioner; such other components include, but are not limited to, curing agents, fluxing agents, wetting agents, flow control agents, adhesion promoters, and air release agents. A curing agent is any material or combination of materials that initiate, propagate, or accelerate cure of the coating and includes accelerators, catalysts, initiators, and hardeners.

EXAMPLES

Compositions according to this invention were prepared to contain the components shown in Table 1. Comparative compositions were prepared to contain the components shown in Table 2. These formulations were tested for performance in a test vehicle comprising a silicon die on an Alloy 42 substrate, in which the adhesive is disposed between the silicon die and substrate and was applied at 110° to 130° C., with 1 to 1.5 Kg force, for 1 to 2 seconds.

The performance testing was done according to the test descriptions given below. The results for the inventive compositions are reported in Table 1, and the results for the comparative compositions are reported in Table 2, under the identified compositions.

Die shear green strength was tested at 175° C. on Dage Bonding die tester.

Hot die shear strength was tested using a Dage Bonding die tester at 260° C., after first heating the test vehicle at 175° C. for four hours.

Moldability after die attach was tested using a Lauffer Molding machine at 175° C. immediately after die attach. Moldability after thermal treatment was tested using a Lauffer Molding machine at 175° C. after first heating the test vehicle at 175° C. for one hour. These are tests of the ability of the adhesive to withstand a subsequent encapsulating process for the test vehicle. The adhesive is deemed successful if there were no indications of voids or die shifting in C-Scanning Acoustic Microscopy (C-SAM) images taken after the test.

Moisture resistance (MRT) was tested by conditioning the test vehicle in a humidity chamber at 85% relative humidity and 85° C. for 168 hours, heating the test vehicle at 260° C. for three minutes and cooling three times, and then using a C-SAM to check for delamination. Delamination was deemed a failure.

Thermal budget was tested by heating the test vehicle at 175° C. for one hour and then introducing it into a Lauffer Molding machine at 175° C. to determine if deformable. Thermal budget is the length of time an adhesive will continue to re-flow and re-cure after initial cure, and not cause outgassing and the formation of voids. (Thermal budget is necessary for die stacking operations.)

TABLE 1

| | INVENTIVE COMPOSITIONS | | |
|---|---|---|---|
| COMPONENTS | A | B | C |
| Acrylate terminated butadiene-acrylonitrile elastomer[a] | 2.5 g | 2.5 g | 2.5 g |
| Epoxy terminated butadiene-acrylonitrile elastomer[b] | 7.5 g | 7.5 g | 7.5 g |
| Epoxy resin[c] | 5 g | 5 g | 5 g |
| THF Acrylate (reactive diluent) | 20 g | | 10 g |
| 4-Hydroxybutyl acrylate glycidylether monomer (reactive diluent) | | 20 g | 10 g |
| 1,4-Cyclohexanedimethanol monoacrylate (reactive diluent) | 5 g | 5 g | 5 g |
| Photoinitiator[d] | 2 g | 2 g | 2 g |
| Silica Filler[e] | 4 g | 4 g | 4 g |
| PERFORMANCE TESTS | PERFORMANCE RESULTS | | |
| Die Shear Green Strength | >200 g | >200 g | >200 g |
| Hot Die Shear Strength | >1000 g | >1000 g | >1000 g |
| Moldability after die attach | Yes | Yes | Yes |
| Moldability after heating 1 hour at 175° C. | Yes | Yes | Yes |
| Die Shift | No | No | No |
| Thermal Budget | up to 1 hr | up to 1 hr | up to 1 hr |
| Moisture Resistance/ Reliability | Passed | Passed | Passed |

Notes on Table 1
[a]Hypro 1300x33 VTBNX, a methacrylate terminated butadiene-acrylonitrile copolymer with a Brookfield viscosity of 150,000 to 250,000 mPa · s at 27° C., purchased from CVC Thermoset Specialties.
[b]Hypro 1300x68 ETBN, a linear epoxy capped low molecular weight butadiene-acrylonitrile copolymer with a Brookfield viscosity of 135,000 to 250,000 mPa · s at 27° C., purchased from CVC Thermoset Specialties.
[c]Epiclon N685-EXP-S, a multifunctional epoxy resin derived from o-cresol-formaldehyde novolac with an epoxy equivalent weight of 207 g/eq, purchased from DIC Corporation.
[d]Darocur 4265, purchased from Ciba.
[e]Silica SE-2030, purchased from Admatechs.

TABLE 2

| | COMPARATIVE COMPOSITIONS | | | | |
|---|---|---|---|---|---|
| COMPONENTS | D | E | F | G | H |
| Acrylate terminated butadiene-acrylonitrile elastomer[a] | 2.5 g | | | | |
| 1,4-Butanediol diacrylate[f] | | 2.5 g | | | |
| Kaneka Macromer (Acrylate-terminated) | | | 2.5 g | 2.5 g | 2.5 g |
| Epoxy terminated butadiene- | 5 g | 7.5 g | 7.5 g | | |

TABLE 2-continued

| | | | | | |
|---|---|---|---|---|---|
| acrylonitrile elastomer[b] | | | | | |
| Polyurethane[h] | | | | 8 g | |
| Epoxy resin[c] | 5 g | 5 g | 5 g | 5 g | 5 g |
| High MW acrylic polymer ME-3500 | | | | | 5 g |
| THF acrylate (reactive diluent) | 10 g | 10 g | 10 g | 20 g | 20 g |
| 4-Hydroxybutyl acrylate glycidylether monomer (reactive diluent) | 10 g | 10 g | 10 g | 10 g | 10 g |
| 1,4-Cyclohexanedimethanol monoacrylate (reactive diluent) | 5 g | 5 g | 5 g | 5 g | 5 g |
| Photoinitiator[d] | 2 g | 2 g | 2 g | 2 g | 2 g |
| Silica filler[e] | 4 g | 4 g | 4 g | 4 g | 4 g |
| Performance Tests: | Performance Results | | | | |
| Green Strength | <100 g | <100 g | <100 g | >100 g | >100 g |
| HDSS | <1000 g | <1000 g | <1000 g | <1000 g | <1000 g |
| Moldability after die attach | Yes | Yes | Yes | Yes | Yes |
| Moldability after 1 hour at 175° C. | No | No | No | No | No |
| Die Shift | Yes | Yes | Yes | No | No |
| Moisture Resistance/ Reliability | N/A | N/A | N/A | No | No |

Notes on Table 2
[a] Hypro 1300x33 VTBNX, a methacrylate terminated butadiene-acrylonitrile copolymer with a Brookfield viscosity of 150,000 to 250,000 mPa · s at 27° C., purchased from CVC Thermoset Specialties.
[b] Hypro 1300x68 ETBN, a linear epoxy capped low molecular weight butadiene-acrylonitrile copolymer with a Brookfield viscosity of 135,000 to 250,000 mPa · s at 27° C., purchased from CVC Thermoset Specialties.
[c] Epiclon N685-EXP-S, a multifunctional epoxy resin derived from o-cresol-formaldehyde novolac with an epoxy equivalent weight of 207 g/eq, purchased from DIC Corporation.
[d] Darocur 4265, purchased from Ciba.
[e] Silica SE-2030, purchased from Admatechs.
[f] SR-213, a low viscosity di-functional monomer, 1,4-butane diol diacrylate, with a Brookfield viscosity of 8 mPa · s at 25° C., purchased from Sartomer.
g. Acrylate terminated oligomer, purchased from Kaneka Corporation.
[h] Estane 5701 Polyurethane, an elastomeric polyurethane, purchased from Lubrizol.
i. Acrylic polymer ME-3500, purchased from Negami Chemical Industrial Co., Ltd.

The results show that the inventive samples gave good performance results.

The results for the comparative compositions show that these compositions failed at one or more of the performance tests. Formulation D failed because it did not have a weight ratio of 1:3 for the vinyl:epoxy elastomers. Formulations E and F failed because they did not contain an acrylate elastomer (the diacrylate was not elastomeric). Formulation F also had a Tg higher than 25° C., at around 30° C. Formulation G failed because although it contained an elastomeric polyurethane, it did not contain reactive functionality. Formulation H failed because it did not contain any reactive elastomers.

What is claimed:

1. An adhesive composition comprising:
   (A) an elastomeric polymer comprising a mixture of a vinyl elastomer and an epoxy elastomer, the mixture present in an amount within the range of 20% to 40% by weight,
   (B) an epoxy resin, present in the adhesive composition in the range of 3% to 10% by weight,
   (C) reactive diluent comprising a combination of two or more diluents, one of which must have carbon to carbon unsaturation, the combination present in the adhesive composition within the range of 35% to 50% by weight of the composition,
   (D) a curing agent, and
   (E) filler, sufficient to bring the total of the composition to 100% by weight.

2. The adhesive composition according to claim 1 in which the mixture of vinyl elastomer and epoxy elastomer are present in a weight ratio of 1:3 and have weight average molecular weights (MW) within the range of 3000 to 100,000.

3. The adhesive composition according to claim 1 in which the vinyl and epoxy elastomers have glass transition temperatures (Tg) within the range of −65° to 20° C.

4. The adhesive composition according to claim 1 in which the vinyl and epoxy elastomers are selected from the group consisting of butadiene-acrylonitrile rubbers, butadiene rubbers, nitrile butadiene rubbers, polyurethane elastomers, polyisobutene elastomers, polyisoprene elastomers, polyester amide elastomers, ethylene-vinyl acetate copolymer elastomers, polypropylene elastomers, polyethylene elastomers, siloxane elastomers, and copolymers prepared from two or more of styrene, isoprene, butadiene, ethylene, and propylene.

5. The adhesive composition according to claim 4 in which the vinyl and epoxy elastomers are butadiene-acrylonitrile rubbers.

6. The adhesive composition according to claim 1 in which the epoxy resin is selected from the group consisting of novolac epoxy resins, bis-phenol epoxy resins, aliphatic epoxy resins, and aromatic epoxy resins.

7. The adhesive composition according to claim 1 in which the epoxy resin has a weight average molecular weight of 3000 or less.

8. The adhesive composition according to claim 1 in which the reactive diluents are selected from the group consisting of THF acrylate monomer, 4-hydroxybutyl acrylate glycidylether monomer, glycidyl acrylate, glycidyl methacrylate, and 1,4-cyclohexanedimethanol monoacrylate.

9. The adhesive composition according to claim 1 in which at least one reactive diluent is an acrylate or methacrylate containing an epoxy or hydroxyl group.

10. The adhesive composition according to claim 1 in which the filler is selected from the group consisting of ground quartz, fused silica, amorphous silica, talc, glass beads, graphite, carbon black, alumina, clays, mica, vermiculite, aluminum nitride, and boron nitride.

* * * * *